(12) United States Patent
Kato et al.

(10) Patent No.: US 7,969,614 B2
(45) Date of Patent: Jun. 28, 2011

(54) IMAGE FORMING APPARATUS CAPABLE OF OUTPUTTING COLOR AND MONOCHROME IMAGES, CONTROL METHOD THEREOF AND COMPUTER READABLE RECORDING MEDIUM

(75) Inventors: Shigetaka Kato, Shinshiro (JP);
Masahiro Kamiya, Toyohashi (JP);
Hitoshi Asano, Toyokawa (JP); Takeshi Nomura, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 715 days.

(21) Appl. No.: 12/014,520

(22) Filed: Jan. 15, 2008

(65) Prior Publication Data

US 2008/0192271 A1    Aug. 14, 2008

(30) Foreign Application Priority Data

Feb. 14, 2007   (JP) ................. 2007-033717

(51) Int. Cl.
| | |
|---|---|
| H04N 1/23 | (2006.01) |
| H04N 1/50 | (2006.01) |
| G06K 15/02 | (2006.01) |
| H04N 1/29 | (2006.01) |
| G06K 15/14 | (2006.01) |
| G03G 15/00 | (2006.01) |
| G03G 15/01 | (2006.01) |

(52) U.S. Cl. ........ 358/2.1; 358/3.24; 358/501; 358/300; 399/38; 399/43; 399/45; 399/46

(58) Field of Classification Search .................... 358/1.9, 358/2.1, 3.24, 501, 518, 300; 399/24, 31, 399/33, 38, 43, 45, 46
See application file for complete search history.

(56) References Cited

U.S. PATENT DOCUMENTS

| | | | | | |
|---|---|---|---|---|---|
| 5,208,663 | A | * | 5/1993 | Hiratsuka et al. | 358/500 |
| 5,920,645 | A | * | 7/1999 | Aida | 358/518 |
| 6,549,657 | B2 | * | 4/2003 | Ohta et al. | 382/173 |
| 7,006,247 | B1 | * | 2/2006 | Sekine et al. | 358/1.9 |
| 2007/0046957 | A1 | * | 3/2007 | Jacobs et al. | 358/1.9 |

FOREIGN PATENT DOCUMENTS

| | | |
|---|---|---|
| JP | 05-088425 | 4/1993 |
| JP | 2001-127935 A | 5/2001 |
| JP | 2001-154825 A | 6/2001 |
| JP | 2002-103753 A | 4/2002 |
| JP | 2003-320715 A | 11/2003 |
| JP | 2004-287665 A | 10/2004 |
| JP | 2005-059248 A | 3/2005 |
| JP | 2005-092384 A | 4/2005 |
| JP | 2005-250970 | 9/2005 |

OTHER PUBLICATIONS

Japanese Notice of Grounds for Rejection, mailed Mar. 24, 2009, directed to counterpart Japanese Patent Application No. 2007-033717; 8 pages.

* cited by examiner

*Primary Examiner* — Scott A Rogers
(74) *Attorney, Agent, or Firm* — Morrison & Foerster LLP

(57) ABSTRACT

An image forming apparatus outputting a color image and a monochrome image obtains data for output image by RIP-convert of accepted image data, and extracts feature of the data for output image. When the data for output image is determined to correspond to a color image, the image forming apparatus outputs a color image corresponding to the data for output image, on condition that the feature satisfies a determination reference.

27 Claims, 10 Drawing Sheets

IMAGE FORMING APPARATUS CAPABLE OF OUTPUTTING COLOR AND MONOCHROME IMAGES, CONTROL METHOD THEREOF AND COMPUTER READABLE RECORDING MEDIUM

This application is based on Japanese Patent Application No. 2007-033717 filed with Japan Patent Office on Feb. 14, 2007, the entire content of which is hereby incorporated by reference.

BACKGROUND OF THE INVENTION

1. Field of the Invention

The present invention relates to an image forming apparatus capable of outputting color images and monochrome images.

2. Description of the Related Art

In connection with the use of image forming apparatuses installed in general companies and offices, unlimited permission of color outputs of copies and prints is often undesirable, considering supplies that are more expensive than monochrome outputs. In such a situation, limiting color outputs is desired.

As a prior art related to output limitation to an image forming apparatus, Japanese Laid-Open Patent Publication No. 2005-250970 discloses a technique in which an MFP (Multi Function Peripherals) receiving electronic data for entering a print job performs, based on an authorizer ID information included in the electronic data, a process asking the authorizer PC (Personal Computer) to authorize output of the electronic data, performs printing on condition that printing is authorized by the authorizer PC, and sends a notice that the output has been authorized, to the PC that entered the print job.

Japanese Laid-Open Patent Publication No. 05-088425 discloses a technique in which an operator of a copying machine is asked to input his/her own code or unique information corresponding to the code through input means, and when the code matches a stored unique code, copy-prohibition of the copying machine is cancelled.

In Japanese Laid-Open Patent Publication No. 2005-250970, however, whether the output is authorized or not is solely determined by the will of the authorizer, and in Japanese Laid-Open Patent Publication No. 05-088425, the scope of permitting operation is determined without exception for a specific user. Therefore, it is difficult by these techniques to realize appropriate control in accordance with the status of image forming apparatus such as the status of use of supplies or in accordance with the nature of the image to be output.

Further, it may be the case that an administrator of an image forming apparatus wishes use of the image forming apparatus with the amount of supplies consumed under control, determining how much amount of supplies is to be consumed in how long a period.

SUMMARY OF THE INVENTION

The present invention was made in view of the foregoing, and its object is to enable an image forming apparatus itself to appropriately determine whether image data input to the image forming apparatus is to be output as a color image or not.

According to an aspect, the present invention provides an image forming apparatus, including: an image output unit outputting a color image and a monochrome image; an accepting part accepting an image data; a processor performing RIP convert on the image data accepted by the accepting part, to provide data for output image; a first determining unit determining whether the data for output image corresponds to a color image or a monochrome image; a feature extracting unit extracting feature of the data for output image; a reference storage storing a determination reference related to the feature, as to whether a color image is to be output by the image output unit; a second determining unit determining, if it is determined by the first determining unit that the data for output image corresponds to a color image, whether the feature satisfies the determination reference related to the feature; and an output controller controlling the image output unit such that a color image corresponding to the data for output image is output, on condition that the second determining unit determines that the determination reference related to the feature is satisfied.

According to another aspect, the present invention provides a control method including the steps of: accepting image data; RIP converting the accepted image data to obtain data for output image; determining whether the data for output image corresponds to a color image or a monochrome image; extracting feature of the data for output image; reading a determination reference related to the feature as to whether a color image is to be output or not; determining, when the data for output image is determined to correspond to a color image, whether the feature satisfies the determination reference related to the feature or not; and outputting a color image corresponding to the data for output image, on condition that the feature satisfies the determination reference related to the feature.

According to a further aspect, the present invention provides a recording medium, recording a program causing an image forming apparatus outputting a color image and a monochrome image and accepting image data, to execute the steps of: determining whether data for output image obtained by RIP convert of the accepted data corresponds to a color image or a monochrome image; extracting feature of the data for output image; reading a determination reference related to the feature as to whether a color image is to be output or not; determining, when the data for output image is determined to correspond to a color image, whether the feature satisfies the determination reference related to the feature or not; and outputting a color image corresponding to the data for output image, on condition that the feature satisfies the determination reference related to the feature.

According to a still further aspect, the present invention provides a recording medium, recording a program causing an image forming apparatus, outputting a color image and a monochrome image and accepting image data, to execute the steps of: RIP converting the accepted image data to obtain data for output image; determining whether the data for output image corresponds to a color image or a monochrome image; extracting position in a document and color information corresponding to the data for output image; storing a determination reference related to position of color image in the document, as to whether a color image or a monochrome image is to be output; and determining, based on the determination reference, whether the data for output image is to be output as a color image or a monochrome image.

According to a still further aspect, the present invention provides an image forming apparatus, including: an image output unit capable of outputting a color image and a monochrome image; an accepting part accepting a job for output, including image data; an extracting unit extracting, based on the job for output and a status of the image output unit, data for comparison related to at least one of these; a reference storing unit for storing a determination reference corresponding to the extracted data for comparison as to whether a color image is to be output from the image output unit or not; a determining unit determining whether the image data corresponds to a color image or a monochrome image, and if it is determined to correspond to a color image, determining whether the data for comparison satisfies the determination reference or not; and an output controller controlling the image output unit such that a color image corresponding to data for output image generated based on the image data is output, on condition that the determining unit determines that the determination reference is satisfied.

According to a still further aspect, the present invention provides a method of controlling an image forming apparatus including an image output unit capable of outputting a color image and a monochrome image, including the steps of: accepting a job for output including image data; extracting, based on the job for output and a status of the image output unit, data for comparison related to at least one of these; reading a determination reference corresponding to the extracted data for comparison as to whether a color image is to be output from the image output unit or not; determining whether the image data corresponds to a color image or a monochrome image, and if it is determined to correspond to a color image, determining whether the data for comparison satisfies the determination reference or not; and causing the image output unit to output a color image corresponding to data for output image generated based on the image data, on condition that the determination reference is determined to be satisfied.

According to a still further aspect, the present invention provides a recording medium storing a program, causing an image forming apparatus accepting a job for output including image data and including an image output unit capable of outputting a color image and a monochrome image, to execute the steps of: extracting, based on the job for output and a status of the image output unit, data for comparison related to at least one of these; reading a determination reference corresponding to the extracted data for comparison as to whether a color image is to be output from the image output unit or not; determining whether the image data corresponds to a color image or a monochrome image, and if it is determined to correspond to a color image, determining whether the data for comparison satisfies the determination reference or not; and permitting the image output unit to output a color image corresponding to data for output image generated based on the image data, on condition that the determination reference is determined to be satisfied.

According to an aspect of the present invention, the image forming apparatus determines whether the accepted image data is to be output as a color image or not based on characteristic of the accepted image data and on a determination reference stored in the image forming apparatus.

According to another aspect of the present invention, the image forming apparatus determines whether the accepted image data is to be output as a color image or not based on whether the comparison data extracted from at least one of the accepted job for output and status of image output unit of the image forming apparatus satisfies the determination reference stored in the image forming apparatus or not.

Therefore, according to the present invention, when the determination reference is set corresponding to the status of the image forming apparatus, it becomes possible for the image forming apparatus to determine whether a color image is to be output or not dependent, for example, on the status of itself.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
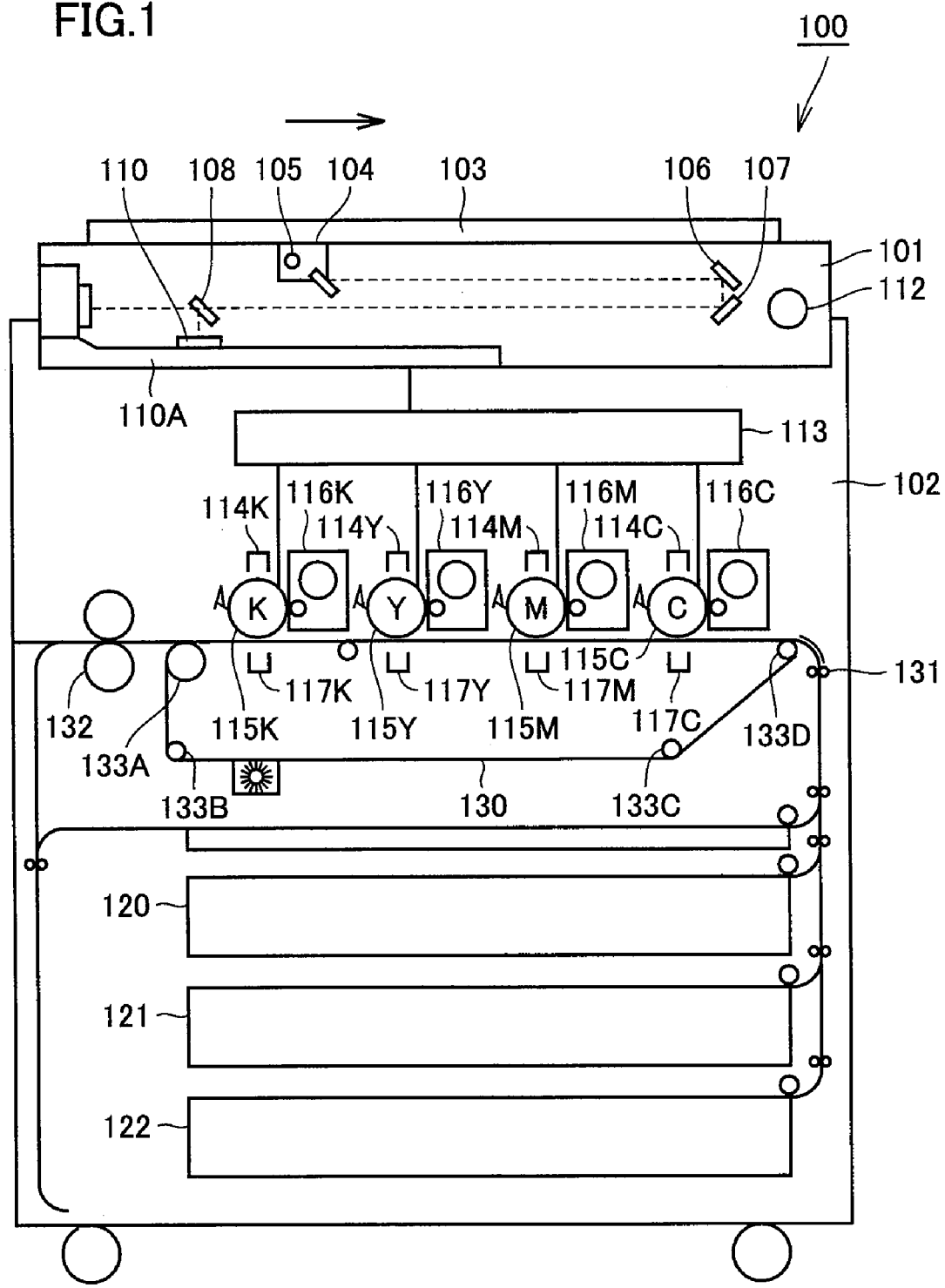
FIG. 1 is a schematic cross-sectional view showing an overall structure of a copying machine as an embodiment of the image forming apparatus of the present invention.

In the following, embodiments of the image forming apparatus in accordance with the present invention will be described with reference to the figures. Throughout the figures, the same components are denoted by the same reference characters. Their names and functions are also the same. Therefore, detailed description thereof will not be repeated.

Further, in the present specification, a print job as an object of a printing operation in the image forming apparatus is assumed to include image data and printing conditions (number of prints and the like) of the image data.

First Embodiment

FIG. 1 is a schematic cross-sectional view showing an overall structure of a tandem-type MFP to which the image forming apparatus in accordance with a first embodiment of the present invention is applied.

Referring to FIG. 1, an MFP 100 includes an image forming unit 101 that reads image data from a document, an image processing unit 110A, and an image output unit 102 for printing images on a sheet of paper.

A document placed on a platen 103 of image forming unit 101 is irradiated with an exposure lamp 105 provided on a scanner 104. Scanner 104 scans the document entirely, as it is moved by a scanner motor 112 in the direction represented by the arrow. Light reflected from the document surface proceeds to mirrors 106 to 108 and to a collecting lens, and forms an image on a CCD (Charge Coupled Device) 110. CCD 110 converts the light reflected from the document surface to RGB color data (analog signal), and outputs the data to an image processing unit 110A. The color data output by CCD 110 to image processing unit 110A is referred to as data for output image.

Image processing unit 110A performs a prescribed image processing on the image data input from CCD 110, and outputs a digital signal to a laser device 113. The digital signal output from scanner 104 to laser device 113 includes image color data C for cyan, image color data M for magenta, image color data Y for yellow and image color data K for black. Based on the input image color data C, M, Y and K, laser device 113 outputs laser beams to photoreceptor drums 115C, 115M, 115Y and 115K of cyan, magenta, yellow and black, respectively.

At image output unit 102, the laser beams output from laser device 113 expose photoreceptor drums 115C, 115M, 115Y and 115K that have been charged by corona chargers 114C, 114M, 114Y and 114K, respectively, forming latent electrostatic images. The latent electrostatic images on photoreceptor drums 115C, 115M, 115Y and 115K are developed by developers 116C, 116M, 116Y and 116K of four colors, that is, cyan, magenta, yellow and black.

An endless belt 130 is suspended not to sag, by means of a driving roller 133A and fixed rollers 133B, 133C and 133D. When driving roller 133A rotates counterclockwise in the figure, endless belt 130 rotates counterclockwise in the figure, at a prescribed speed.

An appropriate sheet of paper is fed by paper feed cassettes 120 to 122, and the sheet of paper is fed from a timing roller 131 to endless belt 130. The sheet of paper fed to endless belt 130 is carried on endless belt 130 and conveyed to the left in the figure. Consequently, the sheet of paper is successively brought into contact with photoreceptor drums 115C, 115M, 115Y and 115K, in the order of cyan, magenta, yellow and black. As the sheet of paper comes into contact with respective photoreceptor drums 115C, 115M, 115Y and 115K, toner images developed on the photoreceptor drums are transferred to the sheet of paper by transfer chargers 117C, 117M, 117Y and 117K that are paired with the photoreceptor drums respectively.

The sheet of paper having the toner image transferred thereto is heated by a fixing roller pair 132. Thus, the toner melts and is fixed on the sheet of paper. Then, the sheet of paper is discharged from image output unit 102.

Figure 2:
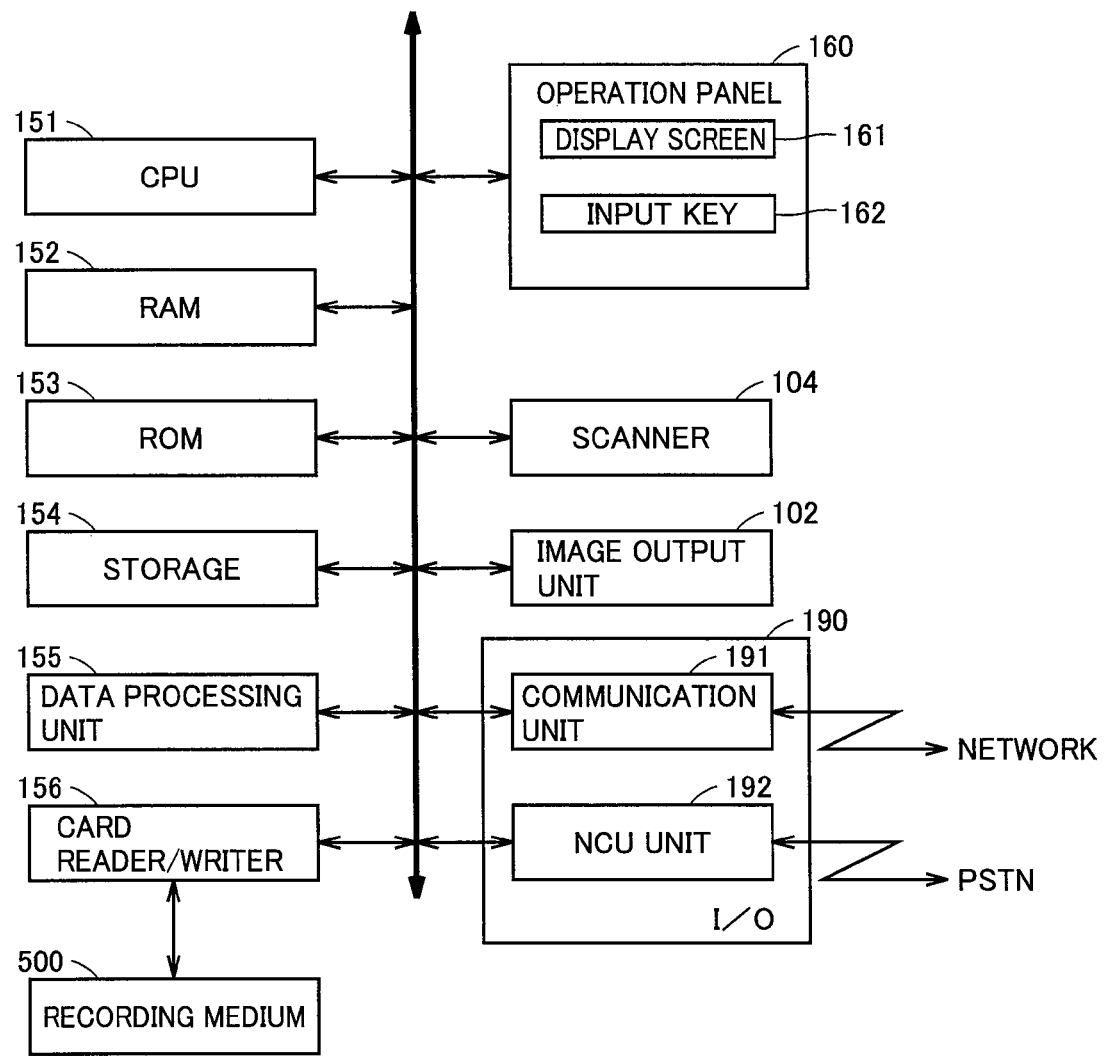
FIG. 2 shows a hardware configuration of the MFP shown in FIG. 1.

FIG. 2 shows a hardware configuration of MFP 100 shown in FIG. 1.

Referring to FIG. 2, MFP 100 includes a CPU (Central Processing Unit) 151 for overall control of the apparatus, an RAM (Random Access Memory) 152 for temporarily storing data, an ROM (Read Only Memory) 153 storing programs and constants, a storage 154 storing data such as the image data, a data processing unit 155 performing processes such as extraction of color data amount of image data, a card reader/writer 156 allowing reading and writing of information from/to a recording medium 500 such as a memory card inserted from the outside, an operation panel 160 receiving user operation, scanner 104, image output unit 102, and an I/O (input/output interface) 190 controlling communication between each of the components in MFP 100 as well as communication to external devices with MFP 100. I/O 190 includes a communication unit 191 for connection to a network, and an NCU (Network Control Unit) 192 for connection to a PSTN (Public Switched Telephone Networks) network. In the present specification, the amount of color data refers to the total number of dots of colors Y, M and C in the document.

Operation panel 160 includes a display screen 161 displaying the status of MFP 100 or command options to the user, and input keys 162. Display screen 161 and input keys 162 may be formed by a liquid crystal display and a touch panel placed thereon.

Figure 3:
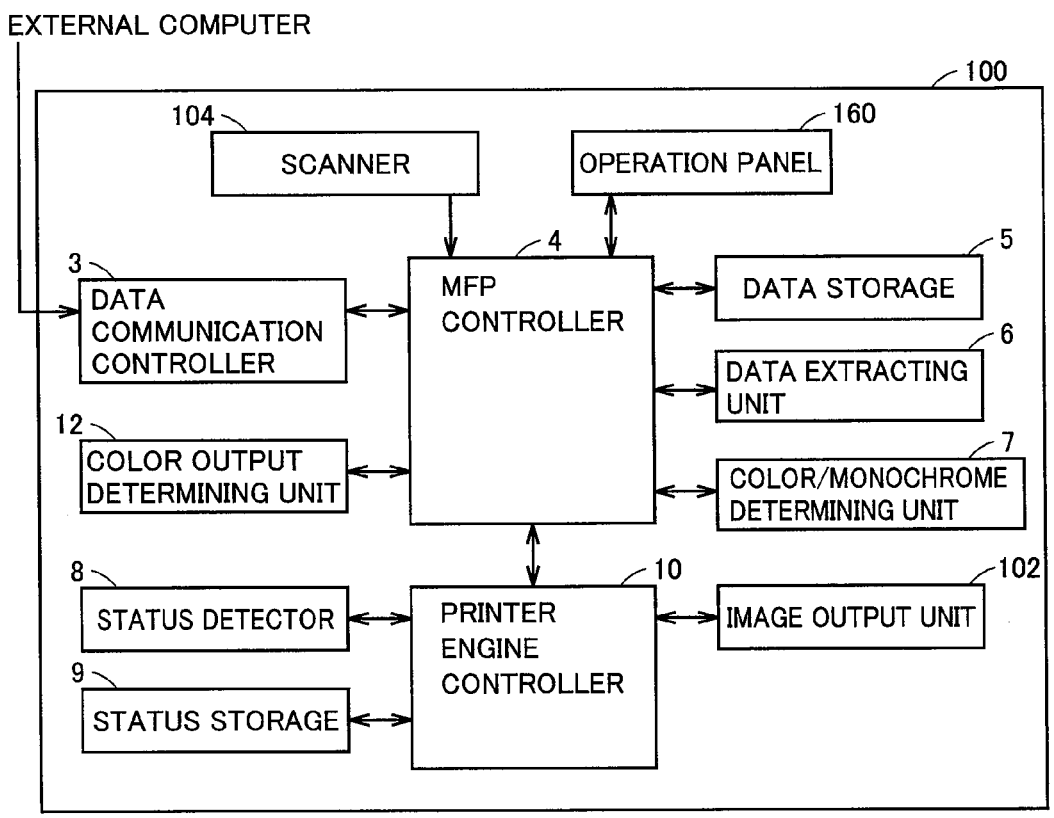
FIG. 3 is a control block diagram of the MFP shown in FIG. 1.

FIG. 3 is a control block diagram of MFP 100.

Referring to FIG. 3, printer engine controller 10 controls an operation of image output unit 102. Printer engine controller 10 includes at least a CPU executing a program related to the control process of image output unit 102, and an ROM storing the program.

A status detector 8 is implemented by sensors or the like for detecting statuses of the photoreceptor unit (photoreceptor drums 115C, 115M, 115Y and 115K), the toner unit (toner cartridges attached to respective developers 116C, 116M, 116Y and 116K and filled with toners of respective colors), the transfer unit (transfer chargers 117C, 117M, 117Y and 117K) for transferring toner to the sheet of paper and of the fixing unit (fixing roller pair 132) for fixing the toner on the sheet of paper.

A status storage 9 is for storing statuses of various portions of image output unit 102 detected by status detector 8, and it is implemented by an RAM or an EEPROM (Electronically Erasable and Programmable Read Only Memory).

An MFP controller 4 is a main controller for performing overall control of MFP 100. It is realized by CPU 151 executing a program stored in ROM 153 or the like.

A data communication controller 3 controls communication between an external computer and MFP 100, and it is implemented by a communication unit 191 (such as a serial interface, a parallel interface, or a network interface).

A data extracting unit 6 executes various processes such as extraction of printing conditions including number of prints (number of pages), number of copies, size of a sheet to be output (paper size) from a print job, RIP (Raster Image Processing) convert of image data, and extraction of color data amount corresponding to the number of dots of each color of Y, M and C using an integration circuit or the like from the RIP-converted image data, and it is implemented, for example, by RAM 152.

A data storage 5 stores image data and history information of print jobs as well as user information, and it is implemented by an auxiliary storage such as RAM 152 or storage 154 (such as a hard disk).

A color/monochrome determining unit 7 is implemented by a control circuit or the like for determining whether the image data that has been RIP-converted by data extracting unit 6 is to be output as monochrome image or color image.

A color output determining unit 12 determines whether the image data as the object of processing is to be output as a color image, as a monochrome image, or as a color image on condition that a password or the like is input through operation panel 160 or the like, and it is realized by CPU 151 appropriately executing a program stored in ROM 153.

MFP controller 4, data extracting unit 6, color/monochrome determining unit 7, printer engine controller 10, status detector 8 and color output determining unit 12 may be implemented by CPU 151 appropriately executing a program stored in ROM 153, or may be implemented by mounting a dedicated LSI (Large Scale Integration).

Next, contents of the printing process for reading an image of a document using scanner 104 and printing the image on an output sheet of paper executed by MFP 100 (that is, the process when MFP 100 is used as a copying machine) will be described with reference to FIGS. 4 and 5, which are flowcharts of the process. The process starts in response to an operation by the user instructing start of the process on operation panel 160.

Figure 4:
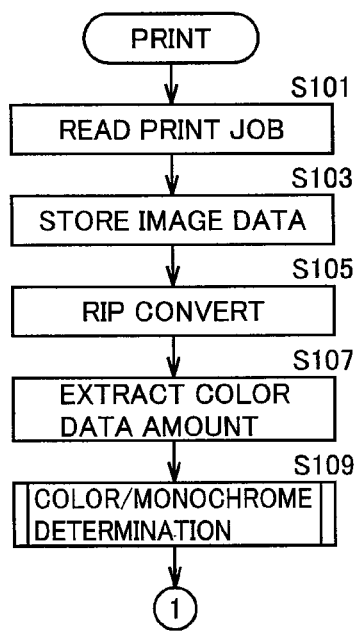
FIGS. 4 and 5 are flowcharts of a printing process executed in the MFP shown in FIG. 1.

First, referring to FIG. 4, at step S101, CPU 151 reads a print job. Specifically, CPU 151 causes scanner 104 to read image data on the document, and reads information related to printing conditions such as the number of copies, input through operation panel 160.

Next, at step S103, CPU 151 stores image data read at step S101 in data storage 5.

Next, at step S105, CPU 151 obtains bit map image data corresponding to the image data stored at step S103 by RIP-convert of the image data.

Figure 6:
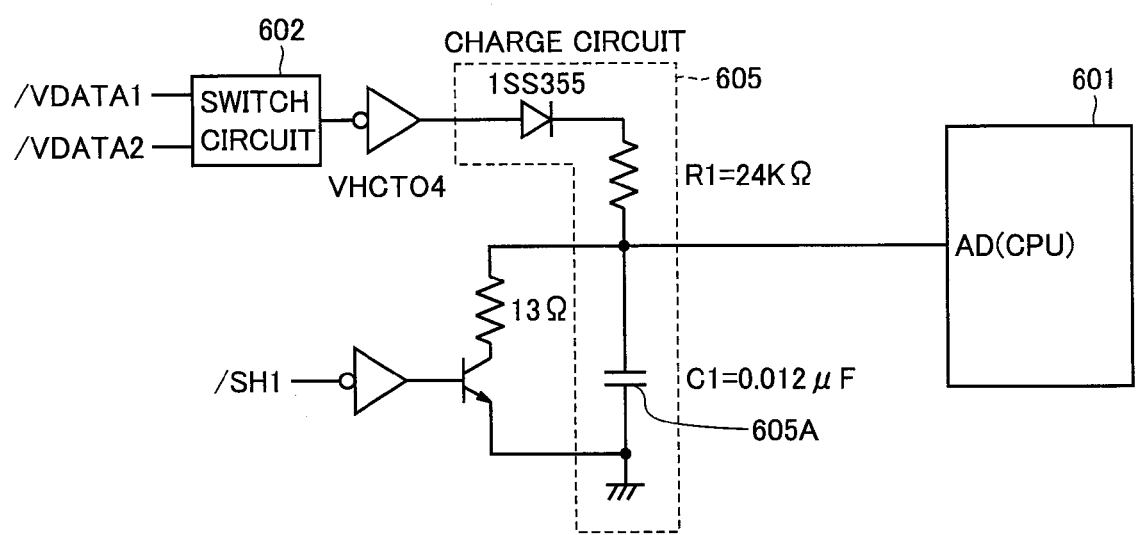
FIGS. 6 and 7 show a manner of extracting the number of dots of each of YMCK colors in the bit map image data, in the MFP shown in FIG. 1.

Next, at step S107, CPU 151 extracts number of dots of each color of Y, M, C and K in the bit map image data obtained at step S105. The number of dots of each color is extracted, for example, by using an integrating circuit. Such extraction of color data amount will be described with reference to FIGS. 6 and 7. FIG. 6 is a circuit diagram of a portion related to color data amount extraction in data extracting unit 6, and FIG. 7 is a timing chart of signals exchanged in the circuit of FIG. 6.

Figure 7:
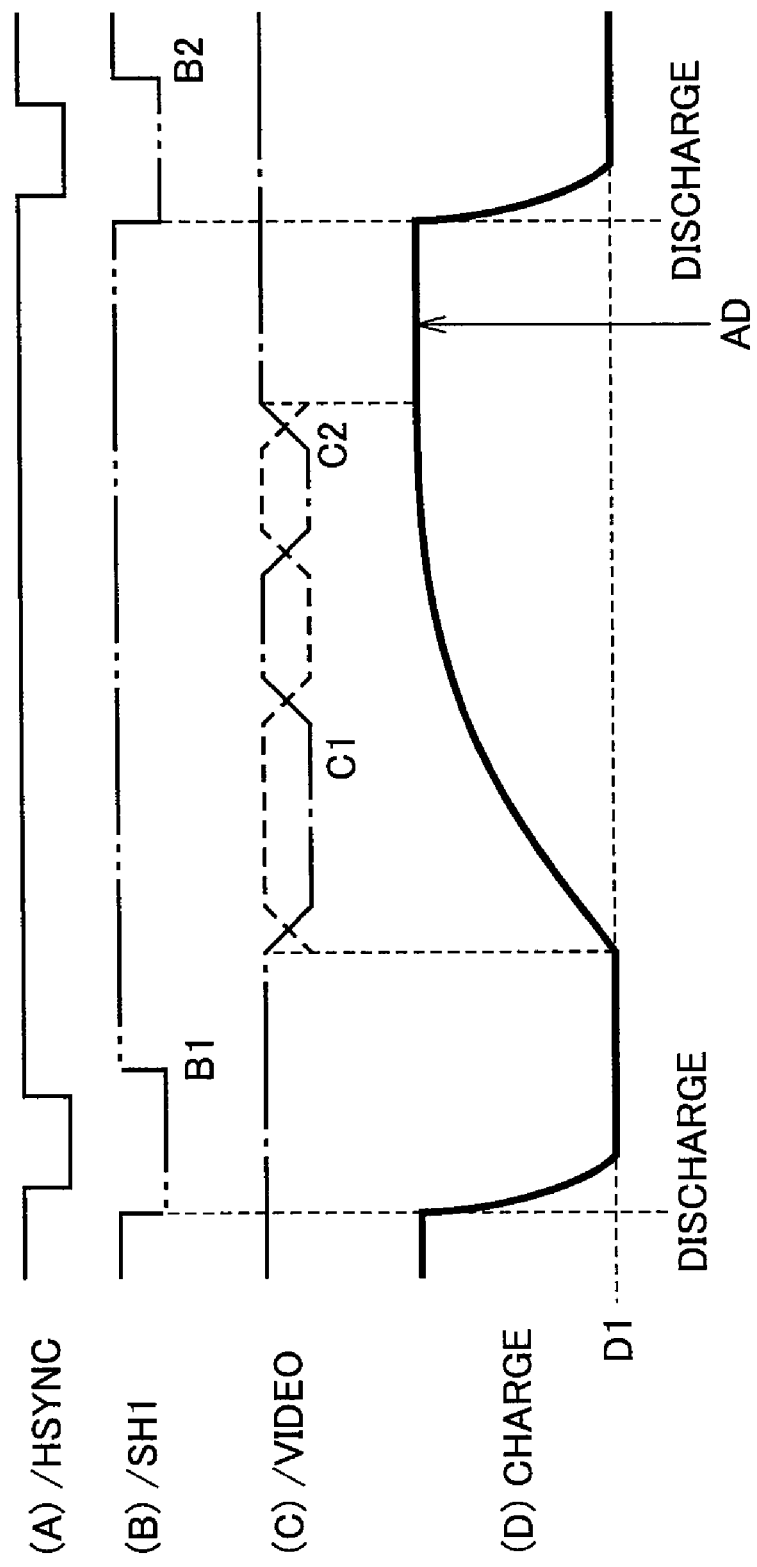

In FIG. 7, (A) represents a horizontal synchronization signal (/HSYNC signal), (B) represents a signal (/SH1 signal) for discharging a capacitor (capacitor 605A described later), (C) represents a signal (/VIDEO signal) representing density value of bit map image data of one color among Y, M, C and K transmitted from MFP controller 4, and (D) represents a voltage level of a capacitor (capacitor 605A described later).

Further, to the circuit shown in FIG. 6, video data (/VIDEO1, /VIDEO2) are input, which data are input based on the bit map image data stored in data storage 5, from MFP controller 4. It is noted that video data are transmitted in the order of Y data, M data, C data and K data. As the data of each color, data from the first line to the last line of the image data are transmitted successively. First, the data from the first line to the last line of Y data are input, then, the data from the first line to the last line of M data are input, then, the data from the first line to the last line of C data are input, and finally, the data from the first line to the last line of K data are input.

Further, switch circuit 602 alternately switches between /VIDEO1 and /VIDEO2. The circuit shown in FIG. 6 is configured such that /VIDEO1 and VIDEO 2 emit light from two LDs (Laser Diodes) in accordance with the video data. In the following, a signal output by either /VIDEO1 or /VIDEO2 by the switching of switch circuit 602 will be denoted as a /VIDEO signal.

A circuit 605 functions as a circuit for charging capacitor 605A. Circuit 605 is configured such that when a signal representing presence of a dot among the video data is input, circuit 605 charges capacitor 605A.

The voltage value of capacitor 605A is input to a mechanical controller 601 of data extracting unit 6. In the present embodiment, capacitor 605A is appropriately discharged when the signal /SH1 is turned on. Therefore, to mechanical controller 601, voltage value of capacitor 605A corresponding to the data per one line of each color is input.

Referring to FIGS. 6 and 7, first, as shown by B1 in FIG. 7, the signal /SH1 is kept at LOW for a prescribed time period, so that capacitor 605A is discharged. Consequently, the voltage value (CHARGE) of capacitor 605A represented by (D) in FIG. 7 decreases to a reference value D1.

Next, the /SH1 signal is returned to HIGH, and the input of /VIDEO signal is received. The circuit shown in FIG. 6 is configured such that capacitor 605A is charged in a period when the /VIDEO signal is LOW, meaning that a dot exists in the video data.

When input of /VIDEO signals of one line is finished, the /SH1 signal is again set to and kept LOW for a prescribed time period as shown at B2 of FIG. 7. Accordingly, the voltage value (CHARGE) of capacitor 605A again decreases to reference value D1, as shown by (D) in FIG. 7.

In mechanical controller 601, based on the maximum voltage value of capacitor 605A in the period when the signal /SH1 is once set to LOW and again set to LOW, the number of dots of the corresponding line is calculated. Such a calculation of the number of dots is performed using an appropriate table stored in mechanical controller 601.

Again referring to FIG. 4, CPU 151 extracts the number of dots of each of Y, M, C and K colors (color data amount) in the bit map image data at step S1107, and then, stores the number of dots of each color in RAM 152 or the like. Then, at step S109, a color/monochrome determining process is performed, for determining whether the bit map image data represents a color image or a monochrome image. Next, the contents of the process will be described with reference to FIG. 8, which is a flowchart of the subroutine of the process.

Figure 8:
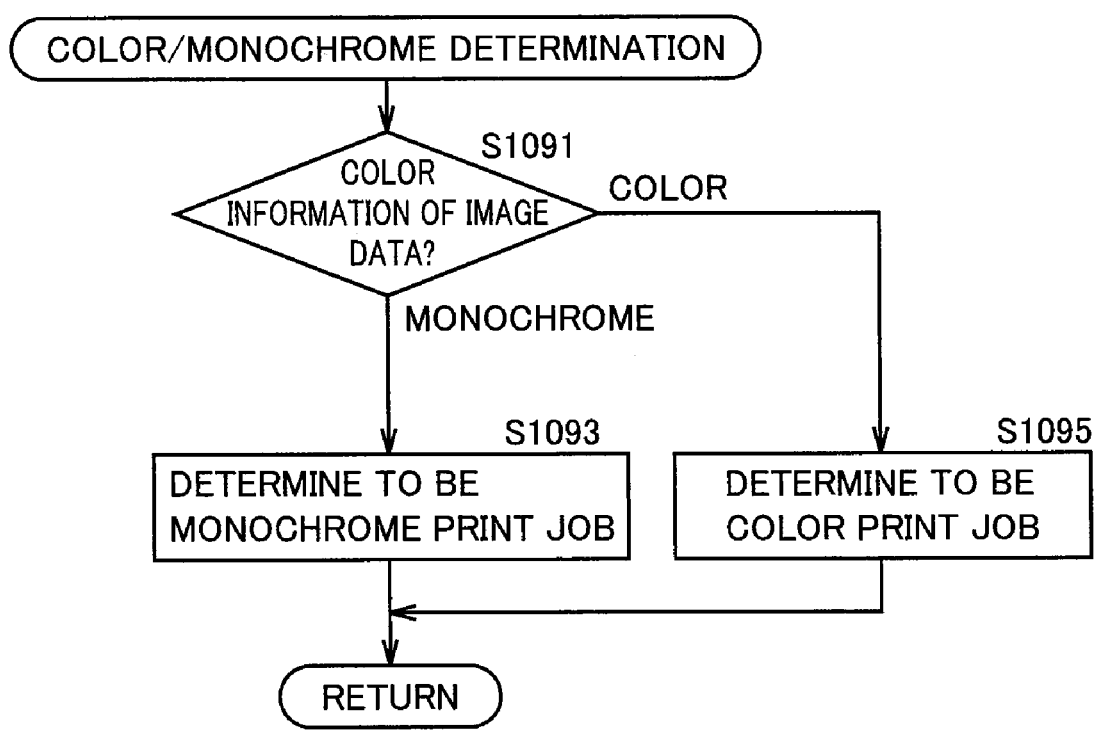
FIG. 8 is a flowchart of a color/monochrome determination process subroutine of FIG. 4.

Referring to FIG. 8, in the color/monochrome determining process, at step S1091, CPU 151 first checks the number of dots of each color in the bit map image data extracted at step S107 to determine whether the number of dots of any of Y, M and C is 1 or more. If so determined, the image is determined to be a color image, and the process proceeds to step S1095. Otherwise, that is, if the number of dots is 0 in Y, M and C, the image is determined to be a monochrome image, and the process proceeds to step S1093.

At step S1093, CPU stores information that the bit map image data as the object of processing correspond to a monochrome image data, in RAM 152, and then the process returns to the main routine.

At step S1095, CPU 151 stores information that the bit map image data as the object of processing correspond to a color image data, in RAM 152, and then the process returns to the main routine.

Figure 5:
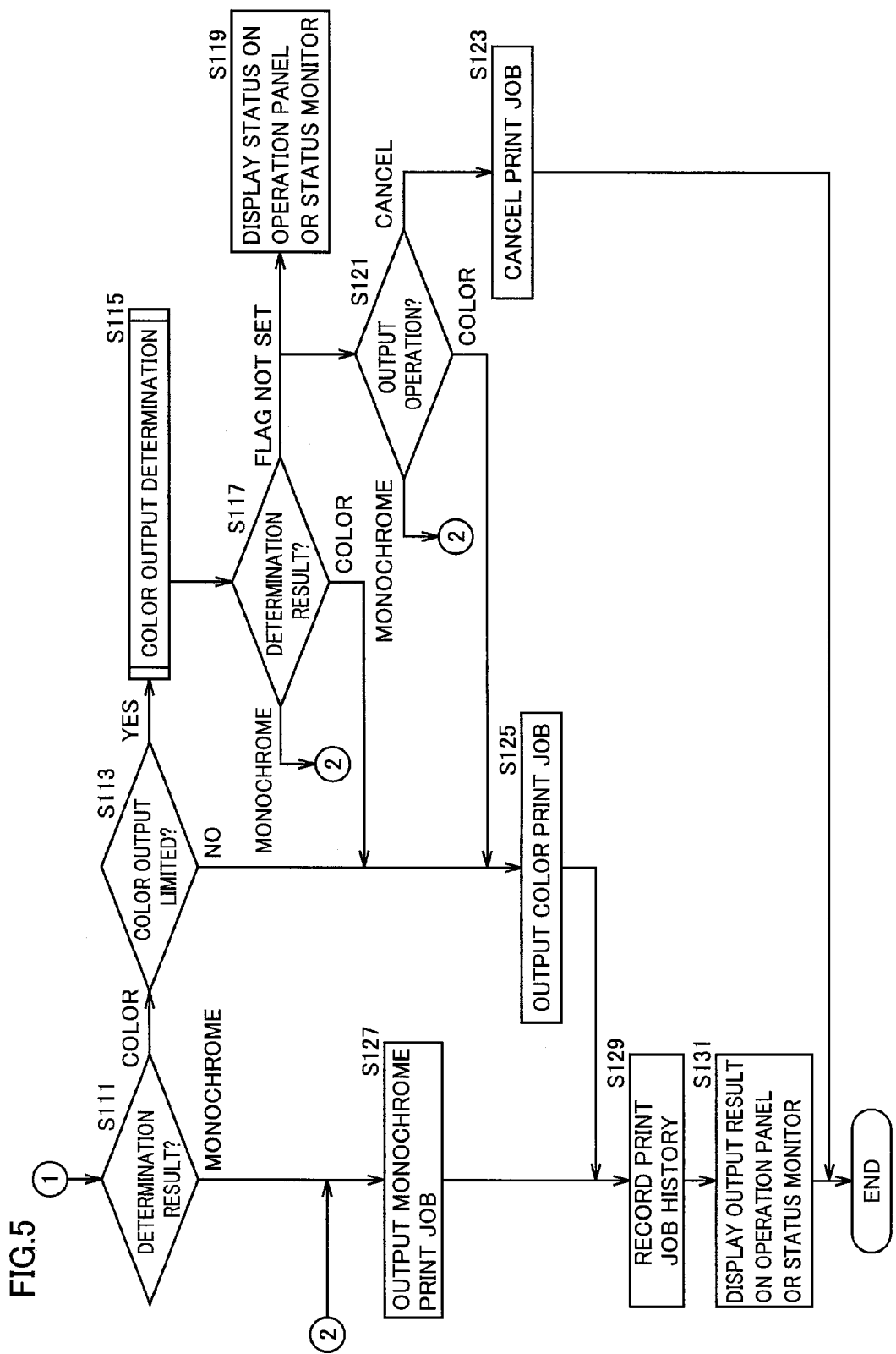

Referring to FIG. 5, after the color/monochrome determining process at step S109 of FIG. 4, CPU 151 checks at step S111 the result of color/monochrome determination, and if the result of determination indicates a monochrome image, proceeds to step S127, and if it indicates a color image, proceeds to step S113.

At step S113, CPU 151 determines whether color output limitation is set in MFP 100 or not.

Here, information set at the time of shipment or set by a user of MFP 100 will be described.

First, in MFP 100, it is possible to set whether color output of a color image is to be limited or not, as described above. Whether it is limited or not is determined dependent on whether information corresponding to "color output limitation" such as shown in Table 1 below is ON or OFF. The information of Table 1 is stored in a non-volatile memory area of data storage 5, the information of ON or OFF may be stored beforehand at the time of shipment, or it may be changed by the user through an operation of operation panel 160 or the like.

TABLE 1

| Color output limitation | ON/OFF |
| --- | --- |

Further, it is possible in MFP 100 to set an approach to be taken when the color output of a color image is limited. It is possible to determine which approach is set, dependent on which of three approaches shown in Table 2, that is, "monochrome output", "cancel" and "color output upon key input" is set as the "approach to be taken when output is limited." The information of Table 2 is stored in a non-volatile memory area of data storage 5, setting of any of the three pieces of information is done beforehand at the time of shipment, or it may be changed by the user through an operation of operation panel 160 or the like.

TABLE 2

| Approach to be taken when output is limited | monochrome output/cancel/color output upon key operation |
| --- | --- |

Further, is possible in MFP 100 to set a reference for limiting color output of a color image. It is possible to determine how the reference is set, by looking at various values of "color data ratio", "toner consumption ratio", "photoreceptor wear ratio", "number of copies", "paper size" and "number of print jobs" shown in Table 3.

TABLE 3

| Limiting information | Reference for determination |
| --- | --- |
| Color data ratio | 60% |
| Toner consumption ratio | 25% |
| Photoreceptor wear ratio | 80% |
| Number of copies | 10 copies |
| Paper size | B4 |
| Number of print jobs | 200 |

The color data ratio represents the ratio of color data amount with respect to the total number of bits of the document. In MFP 100 having the color output limited in accordance with the color data ratio, color input is limited when the color data ratio of the document is equal to or higher than the value shown in Table 3. The total number of bits of a document is calculated based on a resolution set by a printer driver. For example, if the resolution is 600 dpi (dot per inch) and the paper size is A4 (210 mm×297 mm≈8.3 inch×11.7 inch), the total number of dots will be 8.3 inch×600 dpi×11.7 inch×600 dpi≈34,959,600.

The toner consumption ratio represents the ratio of consumption of each color toner of Y, M and C, that is, the ratio of consumed amount with respect to the fully charged amount of toner cartridge. In MFP 100 having the color output limited in accordance with the toner consumption ratio, color output is limited if the toner consumption ratio of the most consumed toner among Y, M and C is equal to or higher than the value shown in Table 3. In the present embodiment, the amount of toner consumption of each color may be found by directly measuring the amount in the toner cartridge, for example, by measuring the weight of toner cartridge, or may be found from the amount of data of each color in the bit map image data output in MFP 100.

The photoreceptor wear ratio represents the degree of wear of photoreceptor of each color, which is 0% if the photoreceptor is not used at all, and 100% if it is used to the maximum. The photoreceptor wear ratio may be calculated by measuring the thickness of photoreceptor of each color, or it may be calculated from the time of driving of the motor rotating the photoreceptor drums of respective colors (photo receptor drums 115C, 115M, 115Y). In MFP 100 having the color output limited in accordance with the photoreceptor wear ratio, color output is limited if the photoreceptor wear ratio of the color having the highest ratio of photoreceptor drum wear among Y, M and C is equal to or higher than the value shown in Table 3.

The number of copies and the paper size are references for limiting color output in the print settings of the print job. In MFP 100 having the color output limited in accordance with the number of copies, color output is limited if the number of copies of the print setting is equal to or higher than the value shown in Table 3, and if the color output is limited in accordance with the paper size, color output is limited if the paper size of the print setting is equal to or higher than the value shown in Table 3.

The number of print jobs is a reference for color output based on a history of output of MFP 100. In MFP 100 having the color output limited in accordance with the number of print jobs, color output is limited if the number of print jobs that provided color outputs, stored in the non-volatile memory area of MFP 100, is equal to or higher than the value shown in Table 3.

Further, it is possible in MFP 100 to set which of the references shown in Table 3 is to be adopted as the reference for limiting color output of a color image. Whether each reference is adopted or not can be determined by making reference to information such as shown in Table 4, indicating whether the limitation of each of the references "color data ratio", "toner consumption ratio", "photoreceptor wear ratio", "number of copies", "paper size" and "number of print jobs" is ON or OFF.

TABLE 4

| Limiting information | Limitation ON/OFF |
| --- | --- |
| Color data ratio | ON |
| Toner consumption ratio | ON |
| Photoreceptor wear ratio | ON |
| Number of copies | OFF |
| Paper size | OFF |
| Number of print jobs | ON |

Again referring to FIG. 5, at step S113, CPU 151 makes reference to such information as shown in FIG. 1, to determine whether setting is to limit color output or not (whether "color output limitation" is ON or not). If it is determined that the limitation is set (ON), the process proceeds to step S115, and otherwise, the process proceeds to step S125.

At step S115, CPU 151 executes a process for determining whether the color output is to be actually limited or not (color output determining process). The contents of this process will be described with reference to FIG. 9, which is a flowchart showing the subroutine of the process.

Figure 9:
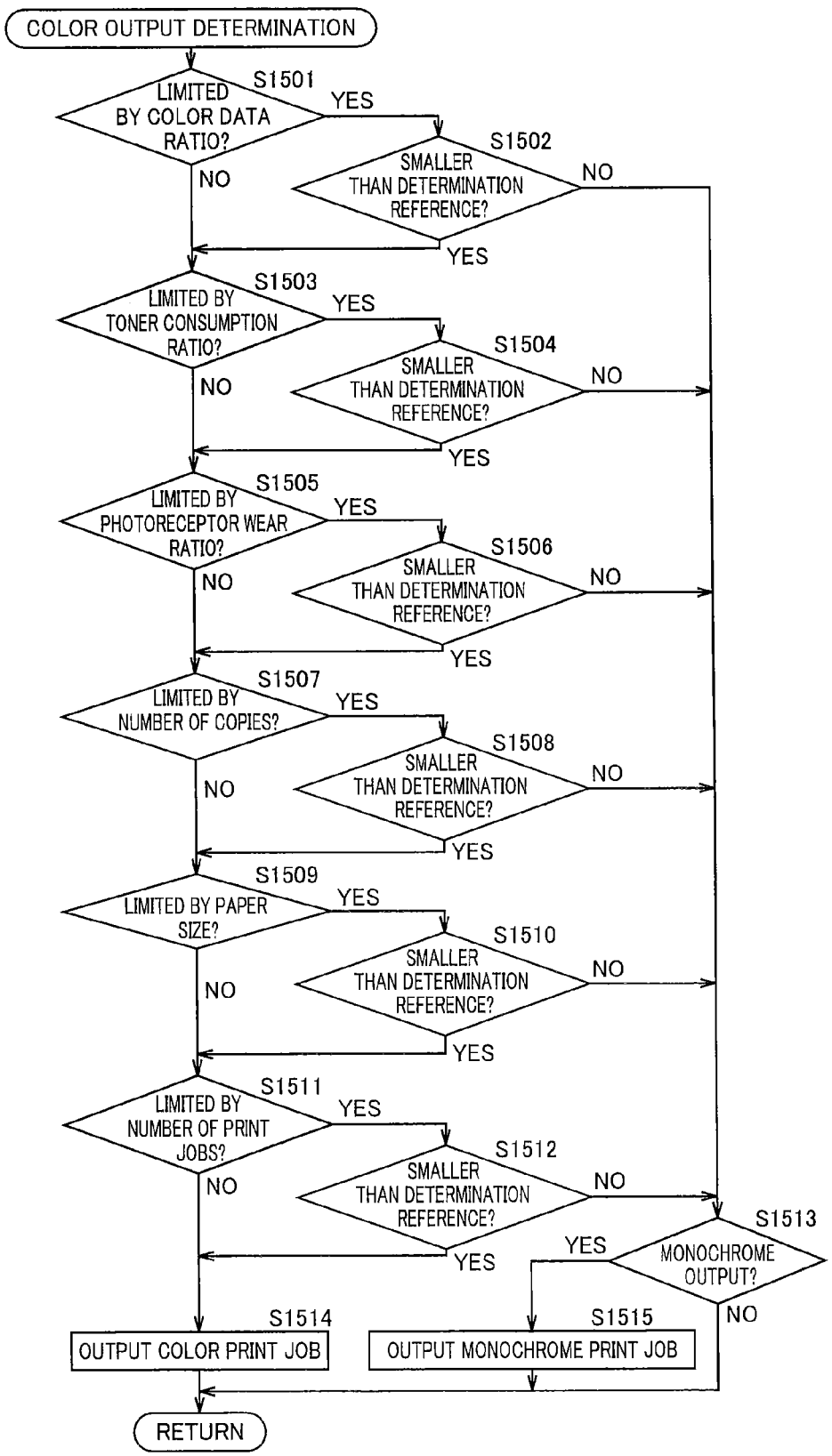
FIG. 9 is a flowchart of a color output determination process subroutine of FIG. 5.

Referring to FIG. 9, in the color output determining process, CPU 151 first makes reference to Table 4 at step S1501, to determine whether color output limitation in accordance with the color data ratio is set or not. If it is set, the process proceeds to step S1502, and otherwise, the process proceeds to step S1503.

At step S1502, CPU 151 determines whether the color data ratio of bit map image data as the object of processing is smaller than the reference value shown in Table 3 or not, and if it is smaller, the process proceeds to step S1503, and if not, the process proceeds to step S1513.

At step S1503, CPU 151 makes reference to Table 4 to determine whether color output limitation in accordance with the toner consumption ratio is set or not. If it is set, the process proceeds to step S1504, and otherwise, the process proceeds to step S1505.

At step S1504, CPU 151 checks toner consumption ratio of each color of Y, M and C, and determines whether the highest toner consumption ratio among these colors is smaller than the reference value shown in Table 3 or not. If it is smaller, the process proceeds to step S1505, and if not, the process proceeds to step S1513.

At step S1505, CPU 151 makes reference to Table 4 to determine whether color output limitation in accordance with the photoreceptor wear ratio is set or not. If it is set, the process proceeds to step S1506, and otherwise, the process proceeds to step S1507.

At step S1506, CPU 151 checks the photoreceptor wear ratio of each color of Y, M and C, and determines whether the highest photoreceptor wear ratio among these colors is smaller than the reference value shown in Table 3 or not. If it is smaller, the process proceeds to step S1507, and if not, the process proceeds to step S1513.

At step S1507, CPU 151 makes reference to Table 4 to determine whether color output limitation in accordance with the number of copies is set or not. If it is set, the process proceeds to step S1508, and otherwise, the process proceeds to step S1509.

At step S1508, CPU 151 determines whether the number of copies of the print setting corresponding to the bit map image data as the object of processing is smaller than the reference value shown in Table 3 or not. If it is smaller, the process proceeds to step S1509 and if not, the process proceeds to step S1513.

At step S1509, CPU 151 makes reference to Table 4 to determine whether color output limitation in accordance with the paper size is set or not. If it is set, the process proceeds to step S1510, and otherwise, the process proceeds to step S1511.

At step 1510, CPU 151 determines whether the paper size of the print setting corresponding to the bit map image data as the object of processing is smaller than the reference value shown in Table 3 or not. If it is smaller, the process proceeds to step S1511 and if not, the process proceeds to step S1513.

At step S1511, CPU 151 makes reference to Table 4 to determine whether color output limitation in accordance with the number of print jobs is set or not. If it is set, the process proceeds to step S1512, and otherwise, the process proceeds to step S1514.

At step S1512, CPU 151 checks the number of jobs that provided color outputs in MFP 100 and determines whether the number of such jobs is smaller than the reference value shown in Table 3 or not. If it is smaller, the process proceeds to step S1514, and if not, the process proceeds to step S1513.

At step S1513, CPU 151 makes reference to contents of settings such as shown in Table 2, and determines if the approach to be taken when the color output of a color image is limited is monochrome output or not. If it is determined to be the monochrome output, at step S1515, CPU 151 converts the bit map image data, which is the color image and the object of processing, to be output as a monochrome image, sets a flag for outputting the data as the monochrome data in RAM 152 or the like, and the process returns. If the approach to be taken when the color image output is limited is not the monochrome output (the approach to be taken is cancellation or color output upon reception of a key operation), CPU 151 directly returns the process to the main routine.

At step S1514, a flag for outputting the bit map image as the object of processing as a color image is set in RAM 152 or the like, and the process returns.

Again referring to FIG. 5, after the color output determination process at step S115, CPU 151 checks the result of determination at step S1117. If the flag representing monochrome image output is set, the process proceeds to step S127, and if the flag representing color image output is set, the process proceeds to step S125. If no flag is set, at step S119, CPU 151 gives a display fitting the actual situation such as a display of a message urging input of an administrative password, on a display 161, and at step S121, waits for an input of the administrative password.

If an input of the administrative password is detected during the standby period at step S121, CPU 151 proceeds to the process of step S125. If the input administrative password designates monochrome output, CPU 151 proceeds to the process of step S127. If the administrative password is not input in a prescribed time period after the start of standby state at step S121, a process for canceling the print job is executed at step S123, and the process is terminated. At step S123, by way of example, a process of deleting the bit map image data as the object of processing is performed. If a value corresponding to "cancel" is set as the "approach to be taken when color output is limited" shown in Table 2, CPU 151 has the flow proceed directly from step S117 to step S123.

At step S127, CPU 151 executes a monochrome print job output process in which the bit map image data is output as a monochrome image, and then the process proceeds to step S129. Here, if the bit map image data is color image data, first, the data is converted to monochrome image data and then, an image corresponding to the data is output.

At step S125, CPU 151 executes a color print job output process in which the bit map image data is output as a color image, and then the process proceeds to step S129.

At step S129, CPU 151 records print job history in a non-volatile memory area of data storage 5, and then the process proceeds to step S131. The information recorded here includes the name of a user who instructed printing (user name), information as to whether the output was a monochrome image or color image, the number of prints (product of the number of documents and the number of printed sheets), the number of copies, time of printing (time when the printing process was executed), document name, and result of execution (normal, trouble, cancel and the like). CPU 151 calculates the number of print jobs that provided color outputs (used for determination at step S1512 of FIG. 9), utilizing the history recorded here. CPU 151 may be configured such that the print job history is cleared after the lapse of a prescribed period, for example, the history may be cleared every week or every month. Further, MFP 100 may be configured such that even when a print job is cancelled at step S123, the fact of canceling is stored in the print job history, at step S129.

At step S131, CPU 151 has the result of execution of the output process of step S125 or S127 on display screen 161, and the process is terminated.

In the present embodiment described above, in MFP 100, whether the bit map image data obtained by RIP convert of document image data formed by scanner 104 is data corresponding to a color image or not is determined, and if the data is determined to be the data corresponding to a color image, various determinations are made, on condition that MFP 100 is in a status of imposing limitation on color output. The determination includes, by way of example, a determination whether the ratio of color data amount of the bit map image data with respect to the total number of bits of the document is smaller than a determination reference or not. If it is smaller than the determination reference, the bit map image data is output as a color image, and if not, an approach of outputting the data as a monochrome image, for example, is taken. The determination reference may be the ratio mentioned above, or it may be the amount of color data, or the ratio of color data amount with respect to the data amount of K (number of bits of K in the bit map image data).

Figure 10:
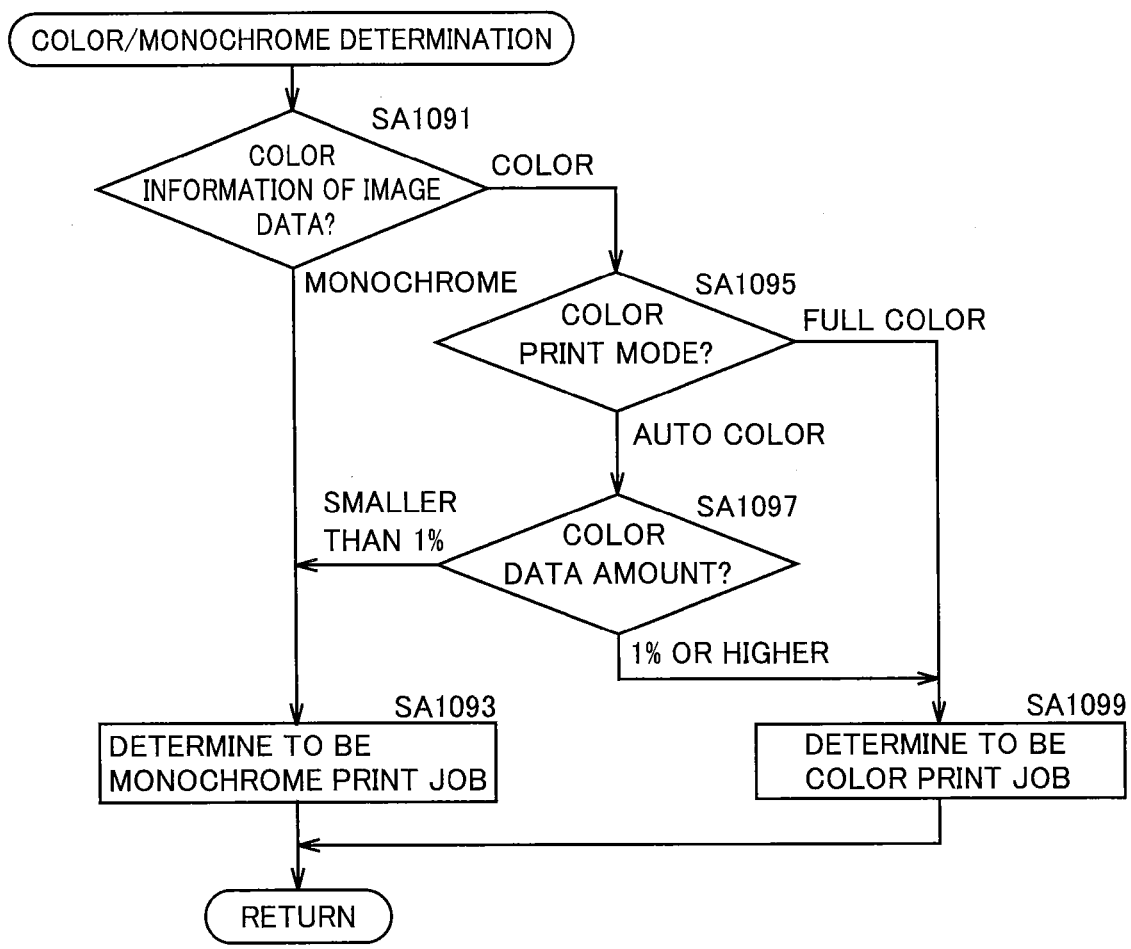
FIG. 10 is a flowchart of a modification of color/monochrome determination process subroutine of FIG. 4.

Further, in the present embodiment described above, the process for determining whether the bit map image data corresponds to a color image or not is as shown in FIG. 8. The present invention is not limited to such a process, and a process in which setting of full color mode or auto color mode is reflected, such as shown in FIG. 10, may be adopted. FIG.

10 is a flowchart of a modification of the color/monochrome determining process. Here, "full color mode" refers to an operation mode in which a color image is output fully in accordance with the bit map image data, and "auto color mode" refers to an operation mode in which an object represented by color data (data containing any of Y, M and C) in the bit map image data is output as a monochrome image if the object is merely a logotype or a stamp. When the color/monochrome determining process is executed in the manner as shown in FIG. 10, MFP 100 is configured to allow registration of either the full color mode or the auto color mode. The contents of registration are predetermined at the time of shipment, or may be changed by the user.

Referring to FIG. 10, in this modification, first at step SA1091, CPU 151 checks the number of dots of each color in the bit map image data extracted at step S107 (see FIG. 4) to determine whether the number of dots of any of Y, M and C is 1 or more, as in step S1091 shown in FIG. 8. If so determined, CPU 151 proceeds to the process of step SA1095. Otherwise, CPU 151 proceeds to the process of step SA1093.

At step SA1093, CPU 151 stores information that the bit map image data as the object of processing corresponds to a monochrome image, in RAM 152, and the process returns to the main routine.

At step SA1095, CPU 151 checks the contents of setting as to the full color mode or the auto color mode. If it is the full color mode, the process proceeds to step SA1099, and if it is the auto color mode, the process proceeds to step SA1097.

At step SA1097, CPU 151 determines whether the amount of color data is equal to or larger than 1% of the total number of bits of the document. If it is determined to be 1% or higher, the process proceeds to step SA1099, and if it is determined to be smaller than 1%, the process proceeds to step SA1093.

At step SA1099, CPU 151 stores information that the bit map image data as the object of processing corresponds to a color image in RAM 152, and the process is returned to the main routine.

In the modification of color/monochrome determining process described above with reference to FIG. 10, if the operation is set to the auto color mode, even the bit map image data corresponding to a color image is treated as data corresponding to a monochrome image, if the ratio of color data amount is smaller than a prescribed value (in FIG. 10, "1%") relative to the entire data. The prescribed ratio may appropriately be changed, for example, to 0.5%, by a user operation through operation panel 160.

Further, in the present embodiment described above, MFP 100 processes image data that corresponds to the image read by scanner 104, as the object of processing. The image data processed by MFP 100 is not limited thereto, and it may be image data accepted through a network, or from a personal computer or the like connected directly (that is, MFP 100 functions as a printer), or it may be image data stored in storage 154 (that is, MFP 100 performs a so-called box print).

Figure 11:
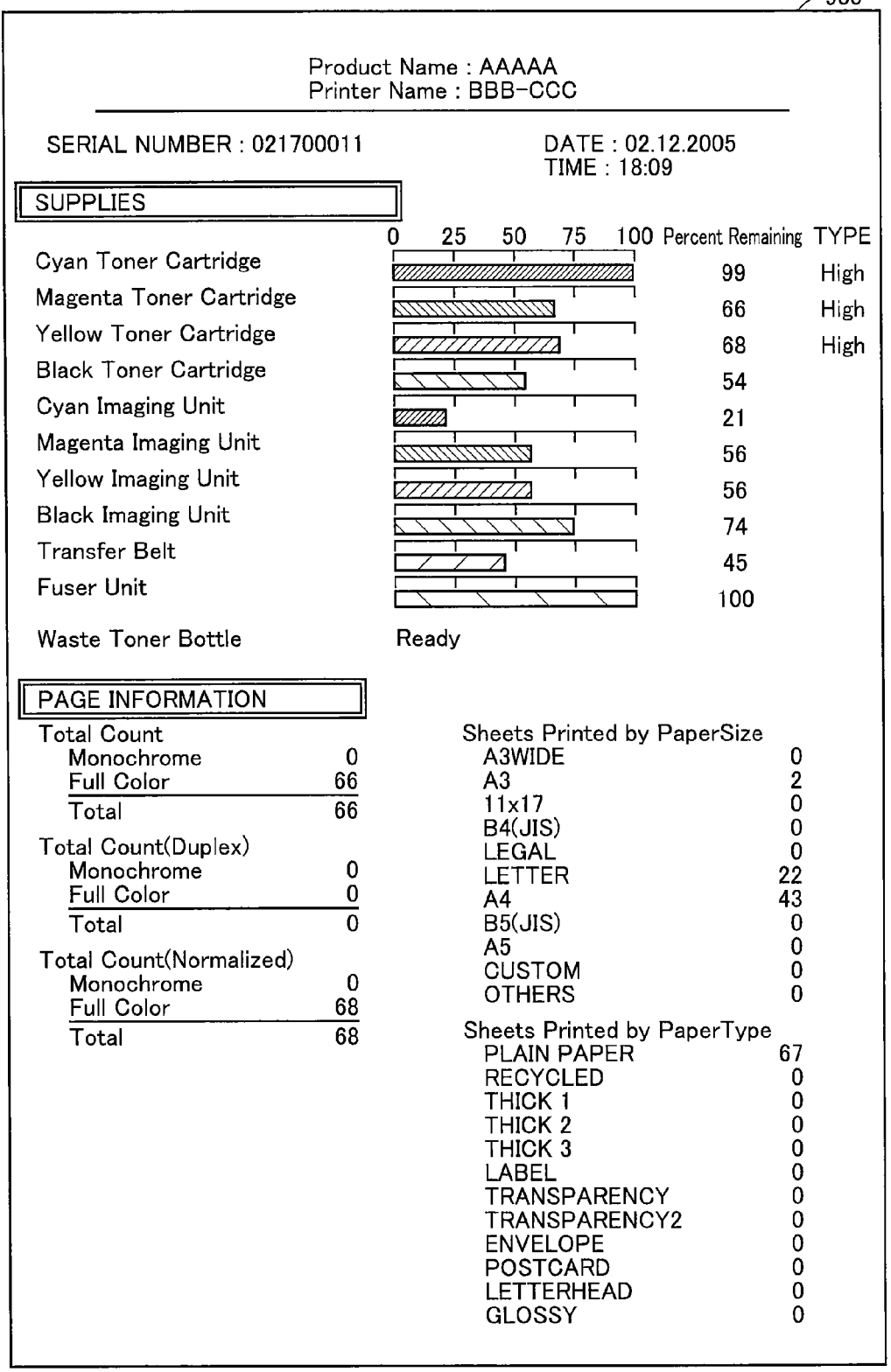
FIG. 11 shows an example of images displayed on the MFP of FIG. 1.

Further, it is always possible in MFP 100 in accordance with the present embodiment to manage the values of color data ratio, toner consumption ratio, photoreceptor wear ratio, number of copies, paper size, number of print jobs and the like of MFP 100, and MFP 100 may be configured such that such values are displayed on display screen 161 in response to an operation of input key 162 or the like. FIG. 11 shows an example of the image displayed in such a situation.

Referring to FIG. 11, an image 900 includes items "SUPPLIES" representing the degree of commodities consumption, and "PAGE information" representing values related to the number of pages on which printing has been done.

In the item "SUPPLIES", "Cyan Toner Cartridge", "Magenta Color Cartridge", "Yellow Toner Cartridge" and "Black Color Cartridge" represent remaining ratio of toners in cartridges of respective colors, that is, C, M, Y and K. The "remaining ratio" is the value obtained by subtracting the toner consumption ratio described above from 100%. Items "Cyan Imaging Unit", "Magenta Imaging Unit", "Yellow Imaging Unit" and "Black Imaging Unit" represent remaining ratio of photoreceptors of respective colors, that is, C, M, Y and K. The "remaining ratio of photoreceptor" is obtained by subtracting the photoreceptor wear ratio described above from 100%. Further, "Transfer Belt" and "Fuser Unit" represent remaining ratios of an endless belt 130 and a fixing roller pair 132, respectively. The remaining ratios are obtained by subtracting respective wear ratios from 100%. Each wear ratio is calculated, for example, based on the time of driving of a motor rotating endless belt 130 or rotating fixing roller pair 132.

On the left side of item "PAGE INFORMATION", total number of prints (Total Count) of ordinary printing, double-sided printing (Duplex) and in the equivalent of standard size (Normalized: number of prints in the equivalent of output on a standard size (for example, A4)) are displayed separately for monochrome images (Monochrome) and color images (Full Color). On the right side, number of prints classified in accordance with paper size (Sheets Printed by Paper Size) and in accordance with paper type (Sheets Printed by Paper Type) are displayed. The information shown in FIG. 11 is appropriately counted based on the contents of print settings included, for example, in the print job.

Each of the processes performed in MFP 100 described above may be realized by CPU 151 executing a program recorded on a recording medium 500 that can be attached to/detached from MFP 100 using a card reader/writer 156, or executing a program downloaded through a network and recorded on ROM 153.

Further, the information such as shown in FIG. 11 may be output printed on a sheet of paper.

In the present embodiment above, an example in which the image forming apparatus is implemented by a so-called tandem type MFP having one photoreceptor drum for each of C, M, Y and K colors has been described. Application of the present invention is not limited thereto, and the image forming apparatus of the present invention may be implemented in an MFP of a type in which four color toners of C, M, Y and K are combined in one rotating body and one photoreceptor drum is applied to four colors.

The configuration described above encompasses an image forming apparatus including: image reading means for reading an image of a color document to obtain image data or data communication means for accepting image data from a computer connected thereto; data extracting means for converting said image data to a raster image and for extracting image feature obtained from the RIP-converted image; and color/monochrome determining means for determining whether said image data is color data or monochrome data; the image forming apparatus further having: output permission/inhibition determining means comparing, for the data that is determined to be a color image, the image feature with a preset determination reference and for determining whether the image data output is to be permitted or not based on the result of comparison; and output control means for outputting said image data in accordance with the result of determination by the output permission/inhibition determining means.

The configuration described above encompasses an image forming apparatus including: image reading means for reading an image of a color document to obtain image data or data communication means for accepting image data from a computer connected thereto; data extracting means for extracting apparatus data obtained from the inside of the image forming apparatus; and color/monochrome determining means for determining whether said image data is color data or monochrome data; the image forming apparatus further having: output permission/inhibition determining means comparing, for the data that is determined to be a color image, the apparatus data with a preset determination reference and for determining whether the image data output is to be permitted or not based on the result of comparison; and output control means for outputting said image data in accordance with the result of determination by the output permission/inhibition determining means.

The configuration described above encompasses an image forming apparatus including: image reading means for reading an image of a color document to obtain image data or data communication means for accepting image data from a computer connected thereto; data extracting means for extracting printing conditions obtained from said image data; and color/monochrome determining means for determining whether said image data is color data or monochrome data; the image forming apparatus further having: output permission/inhibition determining means for determining whether the image data output is to be permitted or not; and output control means for outputting said image data in accordance with the result of determination by the output permission/inhibition determining means.

The configuration described above encompasses an image forming apparatus including: image reading means for reading an image of a color document to obtain image data or data communication means for accepting image data from a computer connected thereto; data extracting means for extracting history of usage of the image forming apparatus; and color/monochrome determining means for determining whether said image data is color data or monochrome data; the image forming apparatus further having: output permission/inhibition determining means comparing, for the data that is determined to be a color image, the image feature with a preset determination reference and for determining whether the image data output is to be permitted or not based on the result of comparison; and output control means for outputting said image data in accordance with the result of determination by the output permission/inhibition determining means.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus, comprising:
   an image output unit outputting a color image and a monochrome image;
   an accepting part accepting an image data;
   a processor performing RIP convert on the image data accepted by said accepting part, to provide data for output image;
   a first determining unit determining whether said data for output image corresponds to a color image or a monochrome image;
   a feature extracting unit extracting feature of said data for output image;
   a reference storage storing a determination reference related to said feature, as to whether a color image is to be output by said image output unit;
   a second determining unit determining, if it is determined by said first determining unit that said data for output image corresponds to a color image, whether said feature satisfies the determination reference related to said feature; and
   an output controller controlling said image output unit such that a color image corresponding to said data for output image is output, on condition that said second determining unit determines that the determination reference related to said feature is satisfied.

2. The image forming apparatus according to claim 1, wherein
   a developing unit develops the image data accepted by said accepting part to bit map image data;
   said feature extracting unit extracts amount of color data of said bit map image data as said feature; and
   said reference storage stores, as the determination reference related to said feature, the amount of color data of said bit map image, or ratio of the amount of color data with respect to total amount of data on an output sheet of paper.

3. The image forming apparatus according to claim 1, further comprising
   a status data extracting unit extracting status data, which is related to a status of said image output unit; wherein
   said reference storage further stores determination reference related to said status data as to whether a color image is to be output by said image output unit;
   said second determining unit determines, on condition that said determination reference related to said feature is satisfied, whether said status data satisfies said determination reference related to said status data or not; and
   said output controller controls said image output unit such that a color image corresponding to said data for output image is output, on condition that said second determining unit determines that the determination reference related to said status data is satisfied.

4. The image forming apparatus according to claim 3, wherein
   said image output unit outputs an image by supplying toner or ink;
   said status data extracting unit extracts, as said status data, remaining amount of toner or ink supplied by said image output unit; and
   said reference storage stores, as said determination reference related to said status data, a reference of remaining amount or consumption ratio from the fully charged status of the image forming apparatus, of toner or ink supplied by said image output unit.

5. The image forming apparatus according to claim 3, wherein
   said image output unit includes a photoreceptor;
   said status extracting unit extracts, as said status data, an amount of use of said photoreceptor; and
   said reference storage stores, as the determination reference of said status data, a reference of the amount of use of said photoreceptor or a ratio of the amount of use of said photoreceptor with respect to a predetermined amount of use of the photoreceptor.

6. The image forming apparatus according to claim 3, wherein
   said status data extracting unit extracts, as said status data, history of color image output of said image output unit; and
   said reference storage stores, as said determination reference related to said status data, a reference to the history of color image output of said image output unit.

7. The image forming apparatus according to claim 6, wherein
said status data extracting unit extracts, as said status data, number of print jobs that provided color image outputs of said image output unit; and
said reference storage stores, as said determination reference related to said status data, a reference to the number of jobs that provided color image outputs of said image output unit.

8. The image forming apparatus according to claim 1, wherein
said accepting part further accepts data of printing conditions related to said image data;
said reference storage further stores a determination reference related to said printing condition data as to whether a color image is to be output by said image output unit;
said second determining unit determines, on condition that said determination reference related to said feature is satisfied, whether said printing condition data satisfies said determination reference related to said printing condition data or not; and
said output controller controls said image output unit such that a color image corresponding to said data for output image is output, on condition that said second determining unit determines that the determination reference related to said printing condition data is satisfied.

9. The image forming apparatus according to claim 8, wherein
said reference storage stores, as said determination reference related to printing conditions, a reference of number of copies in the printing conditions related to said image data; and
said second determining unit determines whether the number of copies in said printing conditions satisfies said determination reference related to said printing condition data.

10. The image forming apparatus according to claim 8, wherein
said reference storage stores, as said determination reference related to printing conditions, a reference of number of prints in the printing conditions related to said image data; and
said second determining unit determines whether the number of prints in said printing conditions satisfies said determination reference related to said printing condition data.

11. The image forming apparatus according to claim 8, wherein
said reference storage stores, as said determination reference related to printing conditions, a reference of printing paper size in the printing conditions related to said image data; and
said second determining unit determines whether the printing paper size in said printing conditions satisfies said determination reference related to said printing condition data.

12. The image forming apparatus according to claim 1, wherein
said output controller controls said image output unit such that said data for output image is output as a monochrome image, when the result of determination by said second determining unit is not to let said image output unit output a color image corresponding to said data for output image.

13. The image forming apparatus according to claim 1, further comprising
an accepting part accepting an input of information from outside; wherein
said output controller controls said image output unit such that said data for output image is output as a color image, on condition that said accepting part has accepted an input of specific information, when the result of determination by said second determining unit is not to let said image output unit output a color image corresponding to said data for output image.

14. The image forming apparatus according to claim 1, wherein
said output controller controls said image output unit such that said data for output image is not output, when the result of determination by said second determining unit is not to let said image output unit output a color image corresponding to said data for output image.

15. A method of controlling an image forming apparatus outputting a color image and a monochrome image, comprising the steps of:
accepting image data;
RIP converting said accepted image data to obtain data for output image;
determining whether said data for output image corresponds to a color image or a monochrome image;
extracting feature of said data for output image;
reading a determination reference related to said feature as to whether a color image is to be output or not;
determining, when said data for output image is determined to correspond to a color image, whether said feature satisfies said determination reference related to the feature or not; and
outputting a color image corresponding to said data for output image, on condition that said feature satisfies said determination reference related to the feature.

16. A computer readable recording medium, recording a program causing an image forming apparatus, outputting a color image and a monochrome image and accepting image data, to execute the steps of:
determining whether data for output image obtained by RIP convert of said accepted data corresponds to a color image or a monochrome image;
extracting feature of said data for output image;
reading a determination reference related to the feature as to whether a color image is to be output or not;
determining, when said data for output image is determined to correspond to a color image, whether said feature satisfies said determination reference related to the feature or not; and
outputting a color image corresponding to said data for output image, on condition that said feature satisfies said determination reference related to the feature.

17. The recording medium according to claim 16, wherein
at said step of reading said determination reference, a reference related to ratio of color data amount with respect to black data amount is read;
at said step of extracting the feature, the color data amount and the black data amount in said data for output image are extracted; and
at said step of determining whether said determination reference is satisfied or not, whether the ratio of the color data amount with respect to the black data amount satisfies said reference related to the ratio or not is determined.

18. The recording medium according to claim 16, wherein
at said step of reading said determination reference, a reference related to color data amount is read;
at said step of extracting the feature, the color data amount in said data for output image is extracted; and
at said step of determining whether said determination reference is satisfied or not, whether the color data amount in said data for output image satisfies said reference related to the color data amount or not is determined.

19. The recording medium according to claim 16, wherein
at said step of reading said determination reference, a reference related to a ratio of color data amount with respect to overall data amount of said data for output image is read;
at said step of extracting the feature, the color data amount and black data amount in said data for output image are extracted; and
at said step of determining whether said determination reference is satisfied or not, whether the ratio of color data amount with respect to the entire data amount of said data for output image satisfies said reference related to the ratio or not is determined.

20. A computer readable recording medium, recording a program causing an image forming apparatus, outputting a color image and a monochrome image and accepting image data, to execute the steps of:
RIP converting said accepted image data to obtain data for output image;
determining whether said data for output image corresponds to a color image or a monochrome image;
extracting position in a document and color information corresponding to said data for output image;
storing a determination reference related to a position of color image in the document, as to whether a color image or a monochrome image is to be output; and
determining, based on said determination reference, whether said data for output image is to be output as a color image or a monochrome image.

21. An image forming apparatus, comprising:
an image output unit capable of outputting a color image and a monochrome image;
an accepting part accepting a job for output, including image data;
an extracting unit extracting, based on said job for output and a status of said image output unit, data for comparison related to at least one of these;
a reference storing unit for storing a determination reference corresponding to said extracted data for comparison as to whether a color image is to be output from said image output unit or not;
a determining unit determining whether said image data corresponds to a color image or a monochrome image, and if it is determined to correspond to a color image, determining whether said data for comparison satisfies said determination reference or not; and
an output controller controlling said image output unit such that a color image corresponding to data for output image generated based on said image data is output, on condition that said determining unit determines that said determination reference is satisfied.

22. The image forming apparatus according to claim 21, wherein
said data for comparison is any of remaining amount of toner charged in said image output unit, an amount of use of a photoreceptor used at said image output unit, and history of color output by said image output unit.

23. The image forming apparatus according to claim 22, wherein
said history of color output is number of jobs that provided color outputs.

24. The image forming apparatus according to claim 21, wherein
said data for comparison is printing condition included in a job for output.

25. The image forming apparatus according to claim 24, wherein
the printing condition is any of number of copies, number of prints, and printing paper size.

26. A method of controlling an image forming apparatus including an image output unit capable of outputting a color image and a monochrome image, comprising the steps of:
accepting a job for output including image data;
extracting, based on said job for output and a status of said image output unit, data for comparison related to at least one of these;
reading a determination reference corresponding to said extracted data for comparison as to whether a color image is to be output from said image output unit or not;
determining whether said image data corresponds to a color image or a monochrome image, and if it is determined to correspond to a color image, determining whether said data for comparison satisfies said determination reference or not; and
causing said image output unit to output a color image corresponding to data for output image generated based on said image data is output, on condition that said determination reference is determined to be satisfied.

27. A computer readable medium storing a program, to be executed by an image forming apparatus accepting a job for output including image data and including an image output unit capable of outputting a color image and a monochrome image, for performing the steps of:
extracting, based on said job for output and a status of said image output unit, data for comparison related to at least one of these;
reading a determination reference corresponding to said extracted data for comparison as to whether a color image is to be output from said image output unit or not;
determining whether said image data corresponds to a color image or a monochrome image, and if it is determined to correspond to a color image, determining whether said data for comparison satisfies said determination reference or not; and
permitting said image output unit to output a color image corresponding to data for output image generated based on said image data, on condition that said determination reference is determined to be satisfied.

* * * * *